United States Patent [19]

De La Cierva, Sr.

[11] Patent Number: 5,686,966
[45] Date of Patent: Nov. 11, 1997

[54] DIGITAL DATA TRANSMISSION SYSTEM FOR TRANSMITTING DIGITAL DATA IN A PREDETERMINED BANDWIDTH WITHOUT DISTORTION

[76] Inventor: Juan De La Cierva, Sr., c/o Interaxx Television Network, Inc., 10800 Biscayne Blvd., N. Miami, Fla. 33161

[21] Appl. No.: 706,968

[22] Filed: Sep. 3, 1996

Related U.S. Application Data

[63] Continuation of Ser. No. 537,510, Oct. 2, 1995, abandoned, which is a continuation of Ser. No. 223,591, Apr. 6, 1994, abandoned.

[51] Int. Cl.$^6$ .................................................. H04N 5/21
[52] U.S. Cl. ...................... 348/461; 348/607; 348/466; 348/465
[58] Field of Search .......................... 348/461, 466, 348/467, 465, 464, 614, 611, 607, 618, 621, 624, 909; 358/167, 36; H04N 5/21, 5/213, 5/217

[56] References Cited

U.S. PATENT DOCUMENTS

| 4,912,549 | 3/1990 | Altman | 358/17 |
|---|---|---|---|
| 5,065,242 | 11/1991 | Dieterich | 348/614 |
| 5,128,747 | 7/1992 | Isnardi | 348/607 |
| 5,144,435 | 9/1992 | Knauer | 348/607 |
| 5,243,428 | 9/1993 | Challapali | 348/607 |

*Primary Examiner*—Sherrie Hsia
*Attorney, Agent, or Firm*—Morgan, Lewis and Bockius LLP

[57] ABSTRACT

Digital data to be communicated are provided with error correcting code. Between consecutive signals representing real, or valid data (pixels in TV transmission) there are interpolated "phantom" data signals so chosen as to maintain the encoded signal within the limited frequency spectrum available for communication. Upon reception, the valid data (pixels) are extracted from the sequence of valid and interpolated data (phantom pixels), thereby reconstituting the original valid data.

13 Claims, 8 Drawing Sheets

DIGITAL DATA TRANSMISSION SYSTEM FOR TRANSMITTING DIGITAL DATA IN A PREDETERMINED BANDWIDTH WITHOUT DISTORTION

This application is a continuation of application Ser. No. 08/537,510, filed Oct. 2, 1995, now abandoned, which is a continuation of application Ser. No. 08/223,591, filed Apr. 6, 1994, now abandoned.

BACKGROUND OF THE INVENTION

The invention relates to a new technique for encoding, transmitting, receiving, and decoding digital data. It further relates to such a technique which uses currently available digital video chips designed to digitally process analog video signals using NTSC, PAL or other video standards, and conventional television transmission channels.

It is known that video-like signals, encoded with digital data instead of their normal video contents, can be modulated on an appropriate carrier and broadcast over the air, by satellite or over existing cable systems. Upon reception, the digital data contents can be recovered. However, this process has heretofore been subject to various burdensome limitations. In some cases, costly special signal-processing chips had to be utilized. In other cases, the digital data could not be communicated at sufficiently high rates without exceeding restrictions on signal characteristics imposed by government regulations (the FCC in the United States), etc.

BRIEF DESCRIPTION OF THE INVENTION

Accordingly, it is an object of the invention to provide a digital data communication technique which overcomes one or more of the limitations of the prior art.

It is another object to provide such a technique which communicates such data with high efficiency.

It is another object to provide such a technique which uses chip sets that were developed for digital TV purposes and that are therefore readily available, and at low cost.

It is another object to provide such a technique in which the integrity of the conventional video channel, its bandwidth, and all other transmission characteristics can remain the same as when normal video signals are carried, so that no special governmental regulations are required for its operation.

It is another object to use existing digital video chip sets for a very different purpose than intended by the chip sets designers, These and other objects which will appear are achieved in accordance with the invention as follows.

The digital data which it is desired to communicate are first provided with error correcting code in conventional manner. Between consecutive signals representing real, or valid data (pixels in TV transmission) there are interpolated "phantom" data signals which are so chosen as to maintain the resulting signal within the limited available frequency spectrum. Upon reception, there is performed essentially the inverse operation, i.e. the valid data (pixels) are extracted from the sequence of valid and interpolated data (phantom pixels), thereby reconstituting the original valid data.

Before proceeding, please note the following. When this document uses the term "pixels" or "video", or other terms from the TV art, it does so not because actual television pictures are involved. Rather, it does so because, in order to achieve the desired low cost, the digital processing apparatus which is used in this invention to process the data, is preferably that apparatus which was developed for digitally processing real TV signals. This apparatus, therefore, produces signals which are analogous to TV signals, even though they really represent data, rather than picture information. As such, the individual data samples are analogous to TV pixels and the composite signal is analogous to video. Indeed, it also contains components analogous to TV blanking and sync, and it is communicated from transmitter to receiver portions in analog TV-like form.

BRIEF DESCRIPTION OF THE DRAWINGS

For further details, reference is made to the discussion which follows, in light of the accompanying drawings, wherein.

DETAILED DESCRIPTION OF THE PREFERRED EMBODIMENT

Figure 1A:
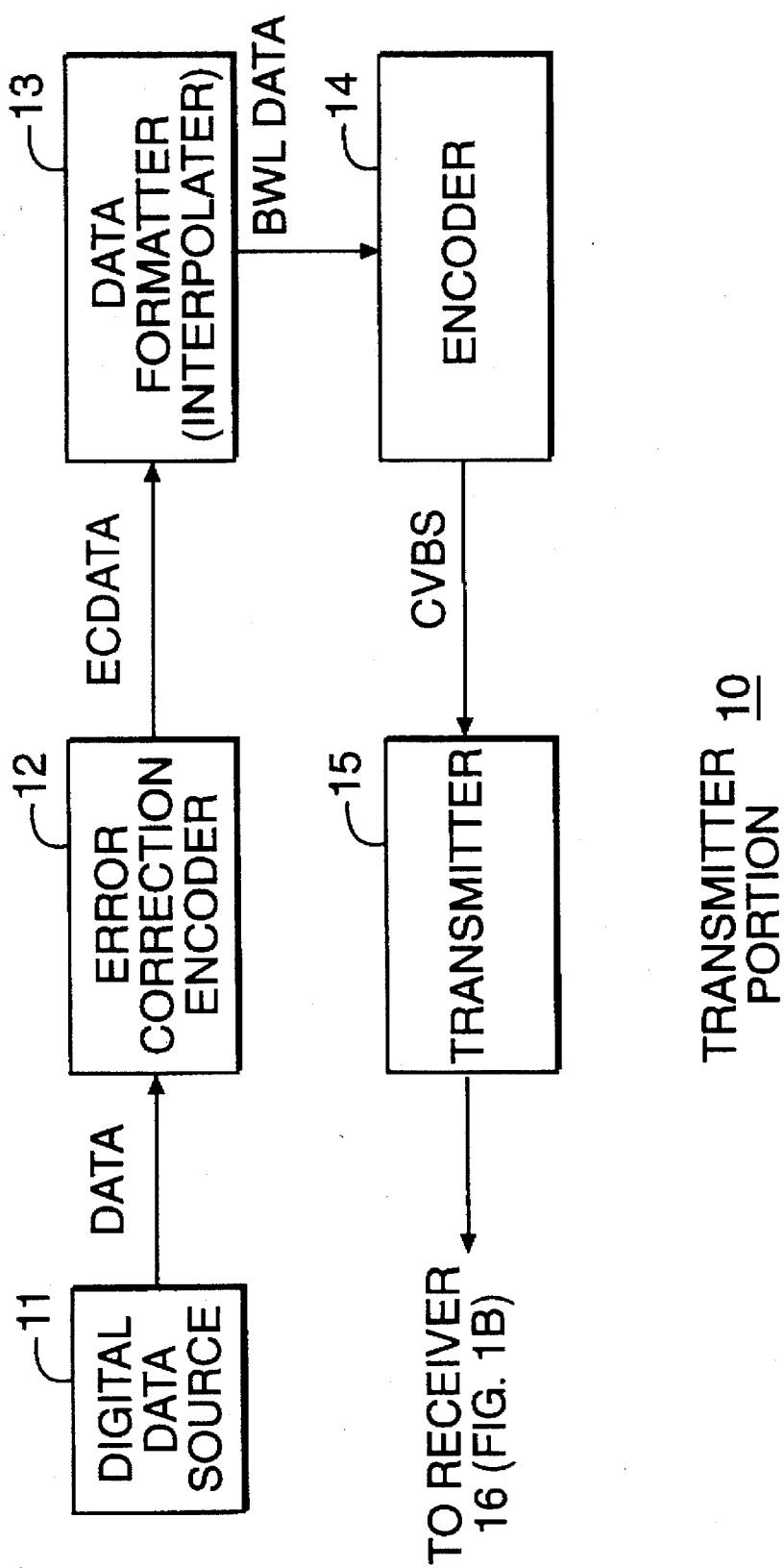
FIG. 1A is a simplified block diagram of the transmitter portion of a system embodying the invention.
Figure 1B:
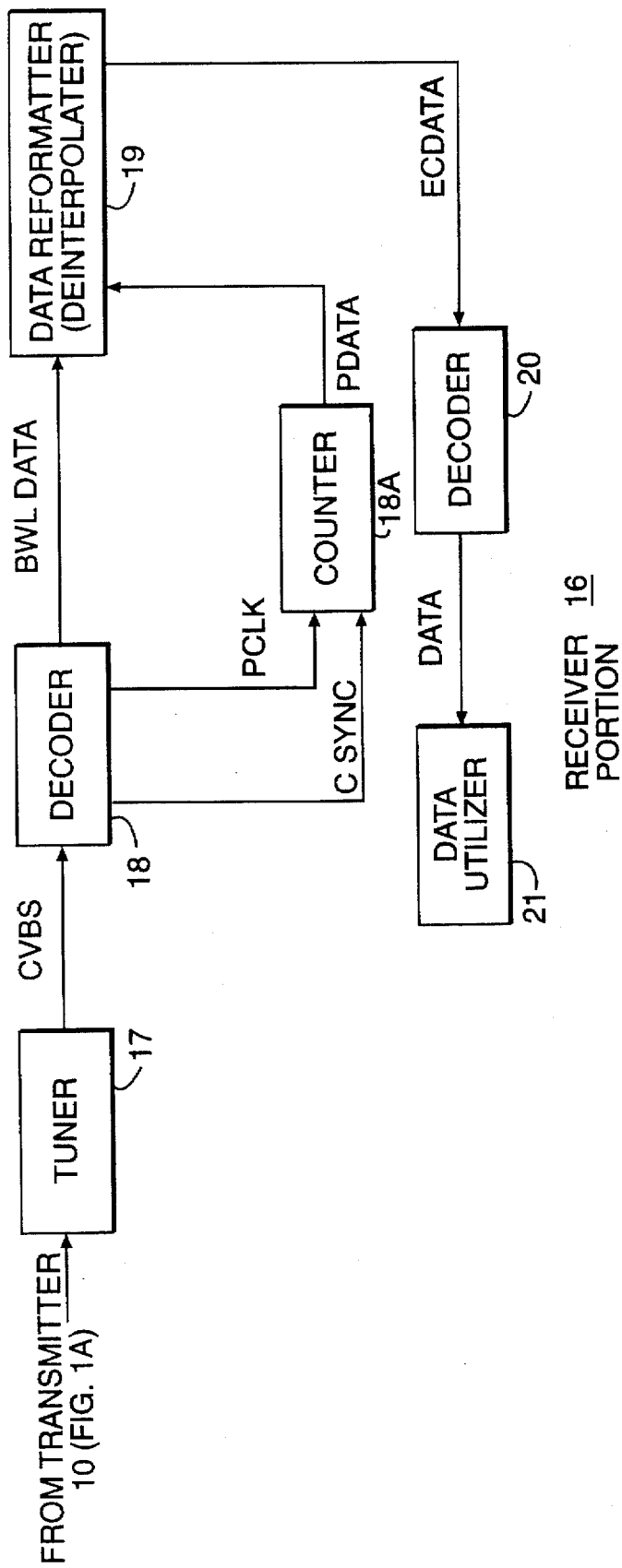
FIG. 1B is a simplified block diagram of the corresponding receiver portion.

Referring to the drawings, FIGS. 1A and 1B are block diagrams of the digital data transmission system (DDTS) embodying the invention. At transmitter portion 10 (FIG. 1A), the desired digital data is initially stored or generated at source 11. It is assumed herein that the original data to be transmitted (Data in FIG. 1A) is organized in (8 bit) Bytes.

From element 11 the data is sent first to an Error Correcting Encoder 12, such as the Reed-Solomon encoder chip LS64710 from LSI Logic Corporation. The LS64710 encoder 12 adds 16 redundant bytes to every K data bytes, where K is an integer between 38 and 239. Other error correcting encoders or protocols may be used without detracting from the generality of the DDTS concept. The DATA plus error correction code is referred to as ECDATA in FIGS. 1A and 1B.

These ECDATA contents could be anything, ranging from sequences of identical values to abrupt transitions to/from any pair of values including 0 to/from 255. If such digital data were to be encoded (in encoder 14 of FIG. 1A) in NTSC, PAL or other television format, large-amplitude data transitions would effectively be "smoothed" by low pass filters within that encoder, because the spectral contents of such transitions would exceed the bandwidth limitations of the video signal. This filtering would distort the contents of the data encoded in the analog composite signal produced at the output of the encoder 14.

For example, assume that the encoder 14 is the Philips SAA7199B Digital video encoder, programmed for RGB 8:8:8 input and 858 total pixels/line of which 720 pixels are active (non-blanking) pixels, corresponding to a pixel clock (PCLK) frequency of 13.5 MHz. Further assume that two consecutive pixels P have values $P(n)=255$ $P(N+1)=0$ The transition time between these two pixels is $TPCLK=1/PCLK=74.074$ nanoSeconds A frequency domain transform of the transition will result in the first harmonic of the transition energy at 13.5 MHz, well above the 4.0 MHz to which the FCC limits the video baseband modulation signal. Evidently, the above-described transition will be "smoothed" by the low pass filter that follows the encoder 14, which, under normal conditions, has a cut-off frequency of 4.0 MHz.

The present invention solves this problem by the use of data formatter 13. This interpolates, between pixels P representing valid data, "phantom pixels" P(ph) chosen to maintain the encoded signal within the limited frequency spectrum. In the example described above, sequential pixels may then look like the following:

| Pixel | Value |
|---|---|
| P(n) = | 255 |
| P(ph1) = | 255 sin²(67.5°) |
| P(ph2) = | 255 sin²(45°) |
| P(ph3) = | 255 sin²(22.5°) |
| P(n + 1) = | 0 |

Note that the angles for each phantom pixel are decreasing quarters of 90°. These angles are selected to achieve a minimum bandwidth in the 255 to 0 transition, since $\sin^2$ wave shapes result in such minimum bandwidth. Such sine square shaped pulses are widely used in television to test bandwidth limited systems. Sine squared pulses can be represented as $$a = A \times \sin^2(2\pi F_c t)$$

where "a" is the instantaneous amplitude of a pulse with maximum amplitude "A" (Volts in IRE units), at a time "t" (seconds), and Fc is the maximum frequency (Hertz) of the spectrum required to pass the sine squared pulse. The Half Amplitude Duration (HAD), or pulse width at 50% maximum amplitude of a sine squared pulse is usually called T, and the pulses are often referred to as "nT" pulses where n is an integer.

Figure 2:
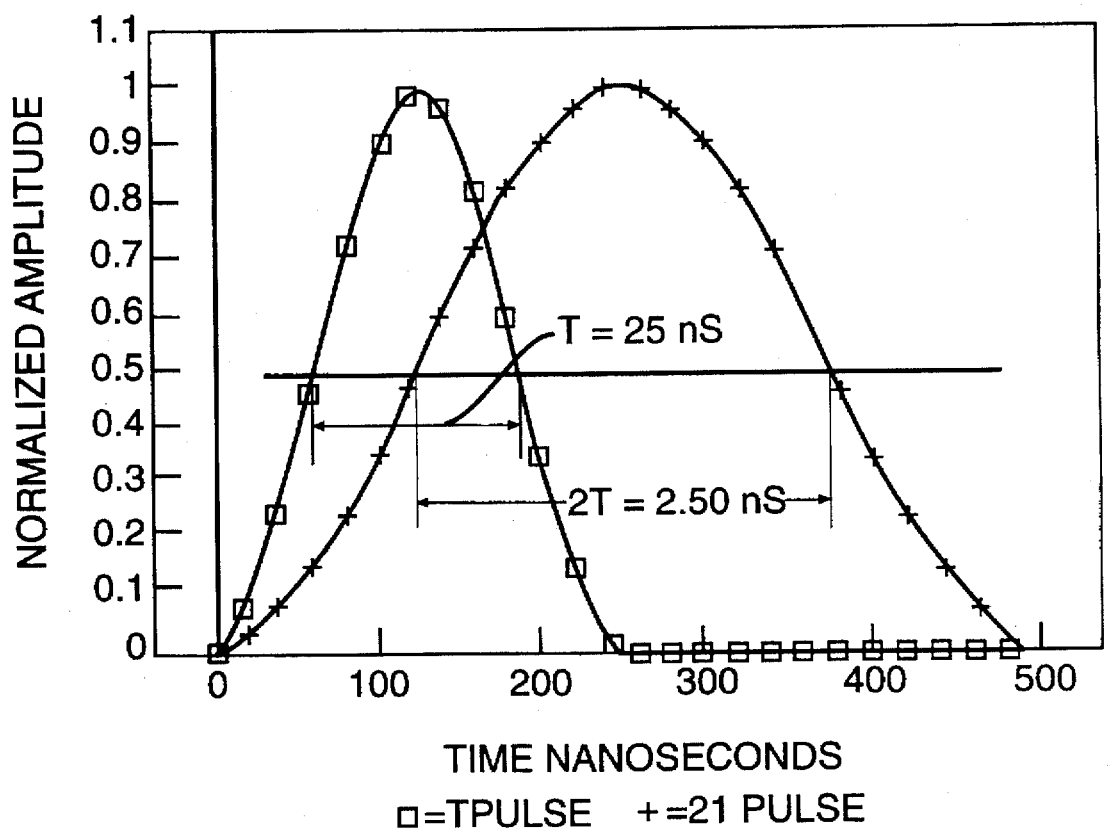
FIGS. 2 through 7 are explanatory diagrams illustrating various characteristics of the invention.

FIG. 2 shows T and 2T pulses with an amplitude normalized to 1.

T is also the Nyquist Interval, and for Fc=4 MHz:

$$T = 1/2F_c = 125 \text{ nanoSeconds}$$

$$2T = 1/F_c = 250 \text{ nanoSeconds}$$

when $F_c$ is the frequency cutoff of the bandwidth. The maximum bandwidth of an NTSC 2T pulse is 4 MHz, corresponding to the maximum video frequency of the channel.

Several well known video test signals can be used to illustrate how sharp video transitions are shaped to meet the channel bandwidth limitations. The next paragraphs analyze "2T" pulses used in "Convergence" test signals and up or down transitions used in a "checkerboard" pattern. While these signals are obtained with an analog video pattern generator, they show the same "bandwidth limiting" features used in the digital data transmission system described in this document.

Figure 3:
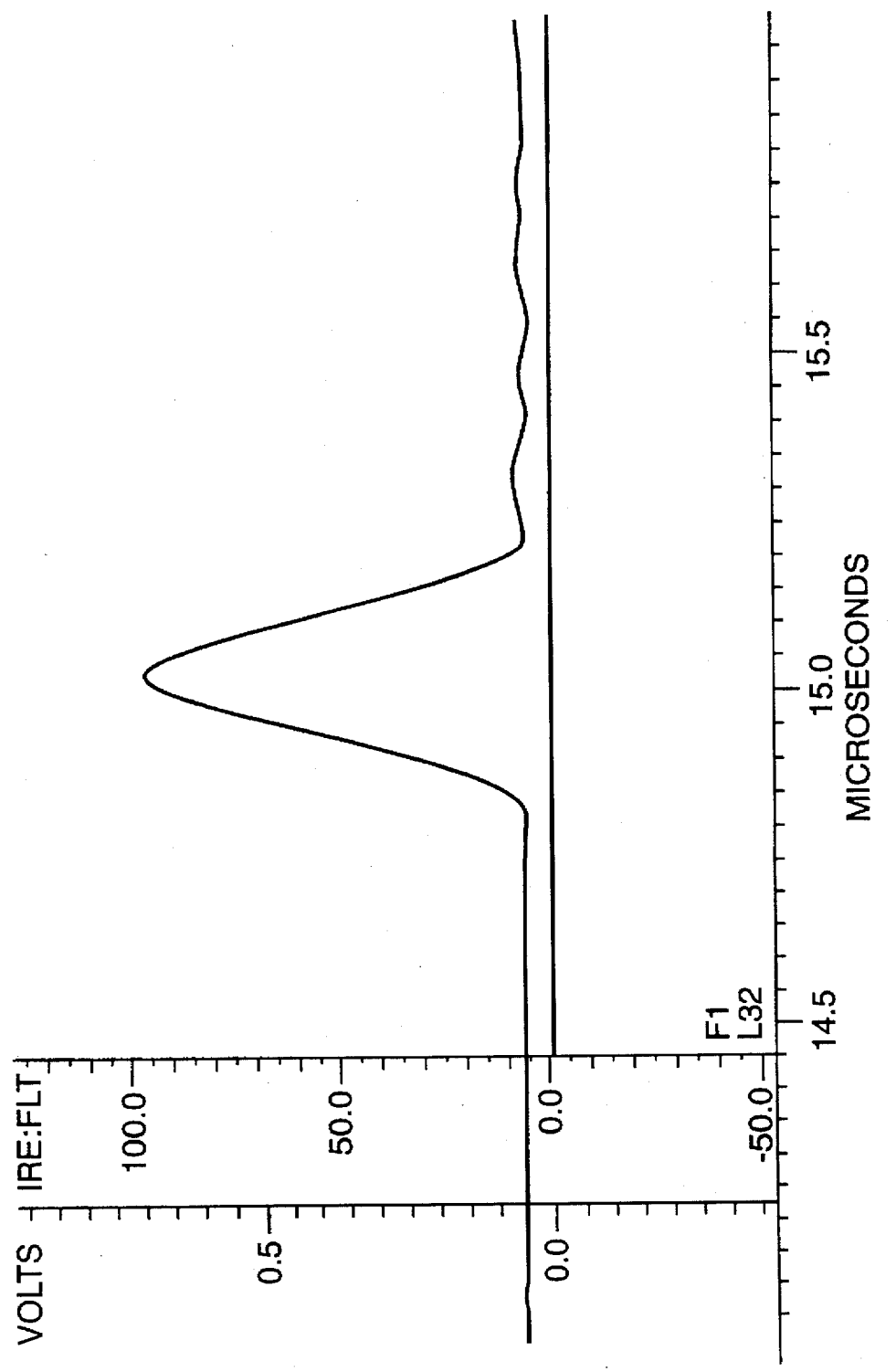
Figure 4:
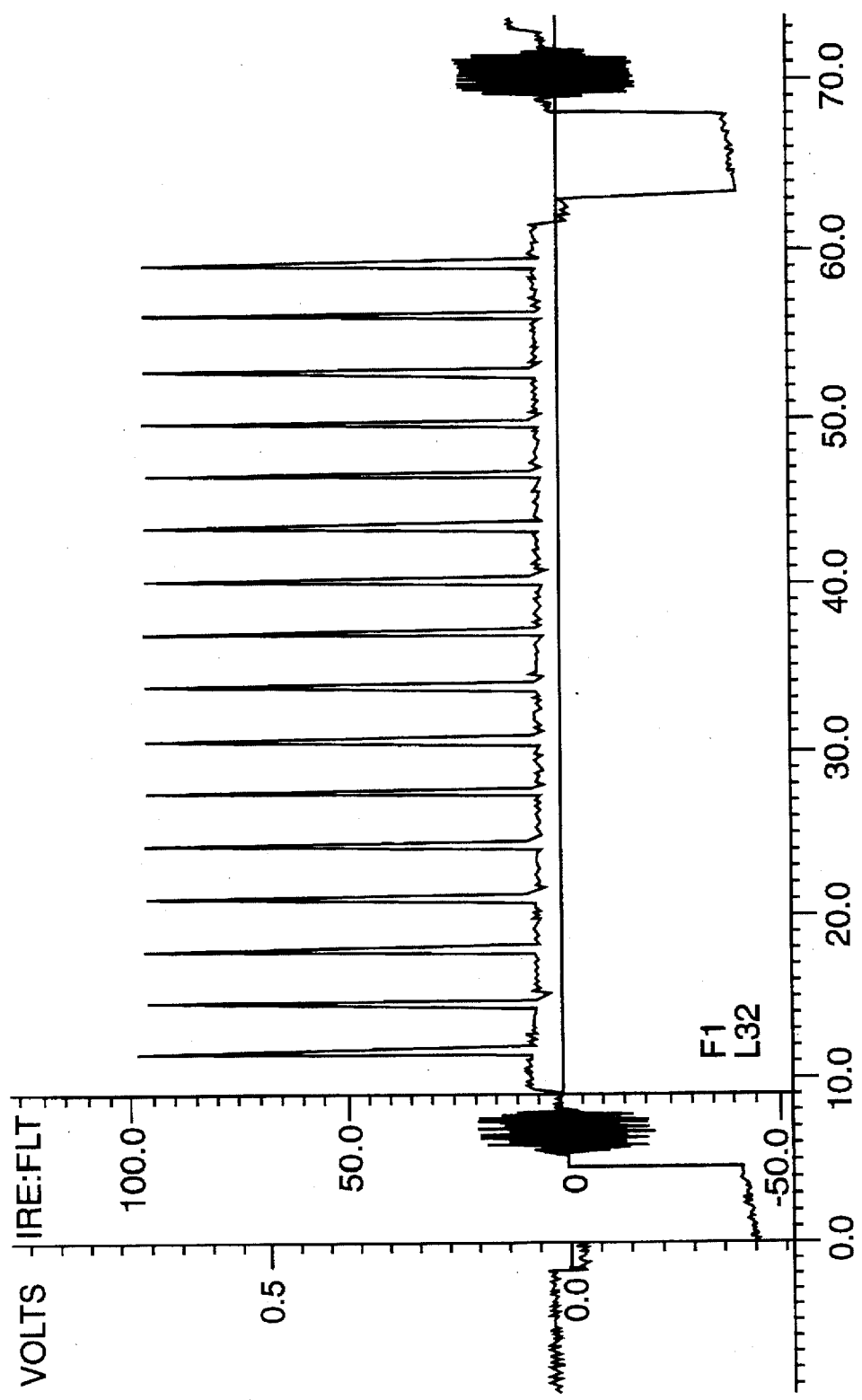

FIG. 3 shows a 2T pulse created in a Philips PM5418TX TV Pattern generator as a part of the standard "Convergence" signal shown in FIG. 4. FIGS. 3 and 4 were plotted in a Postscript printer using a Tektronix VM700A Video Measurement Set.

Figure 5:
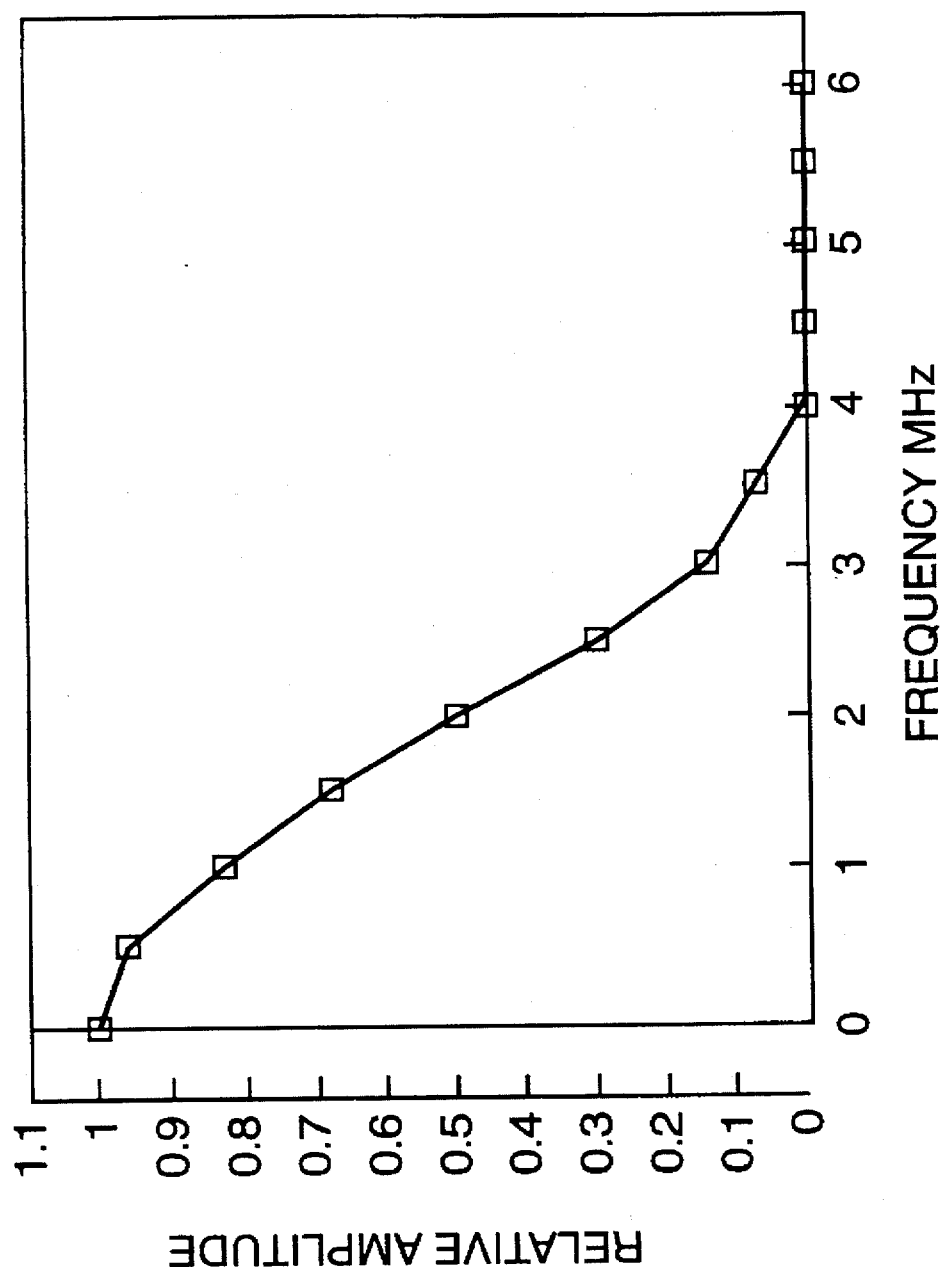

The spectral distribution of 2T pulses is shown in FIG. 5 and, indeed, its spectrum is contained between 0 and $F_c$.

Figure 6:
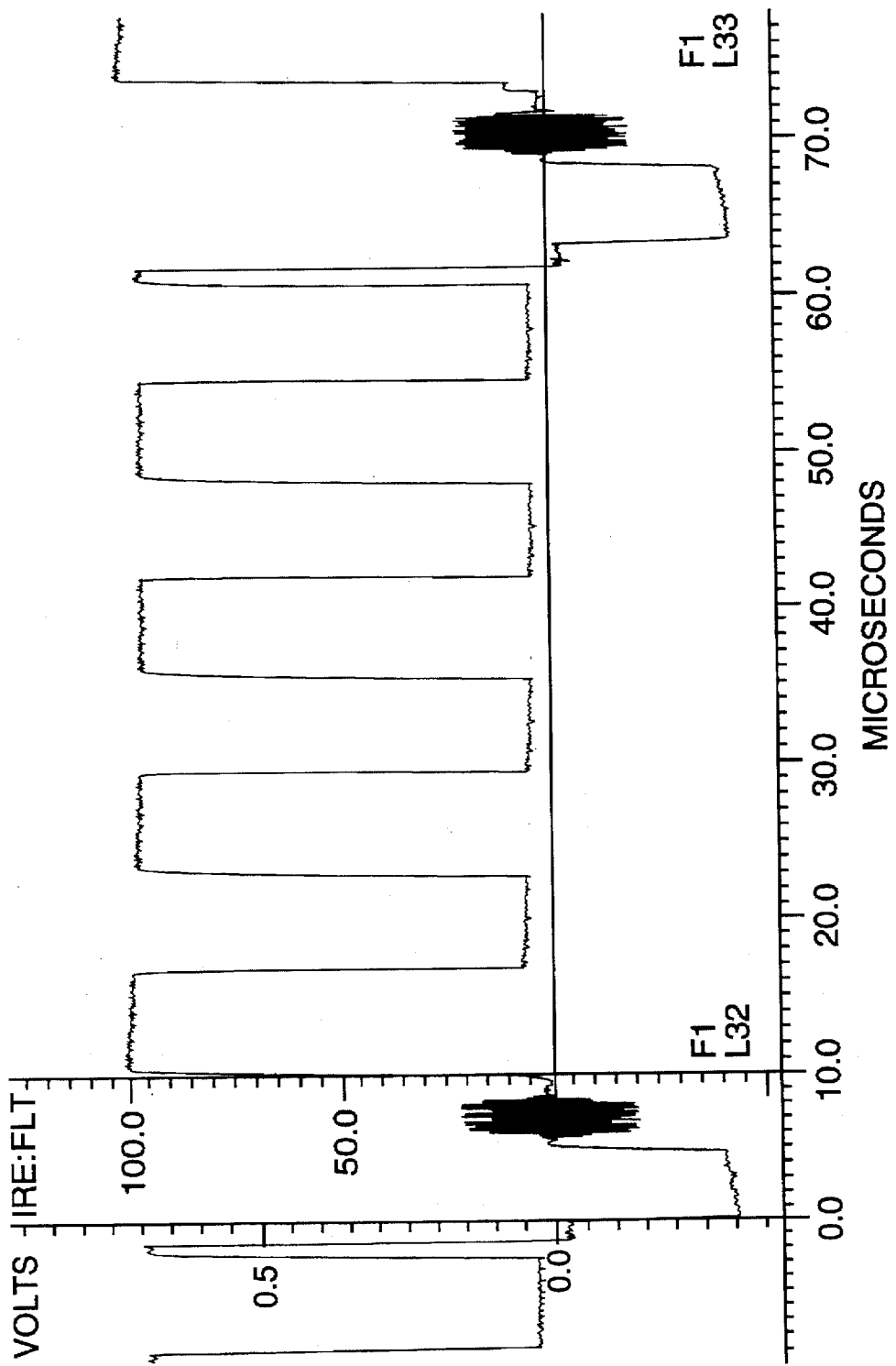

FIG. 6 is Line 32 in a checkerboard pattern, generated and plotted as indicated above.

Figure 7:
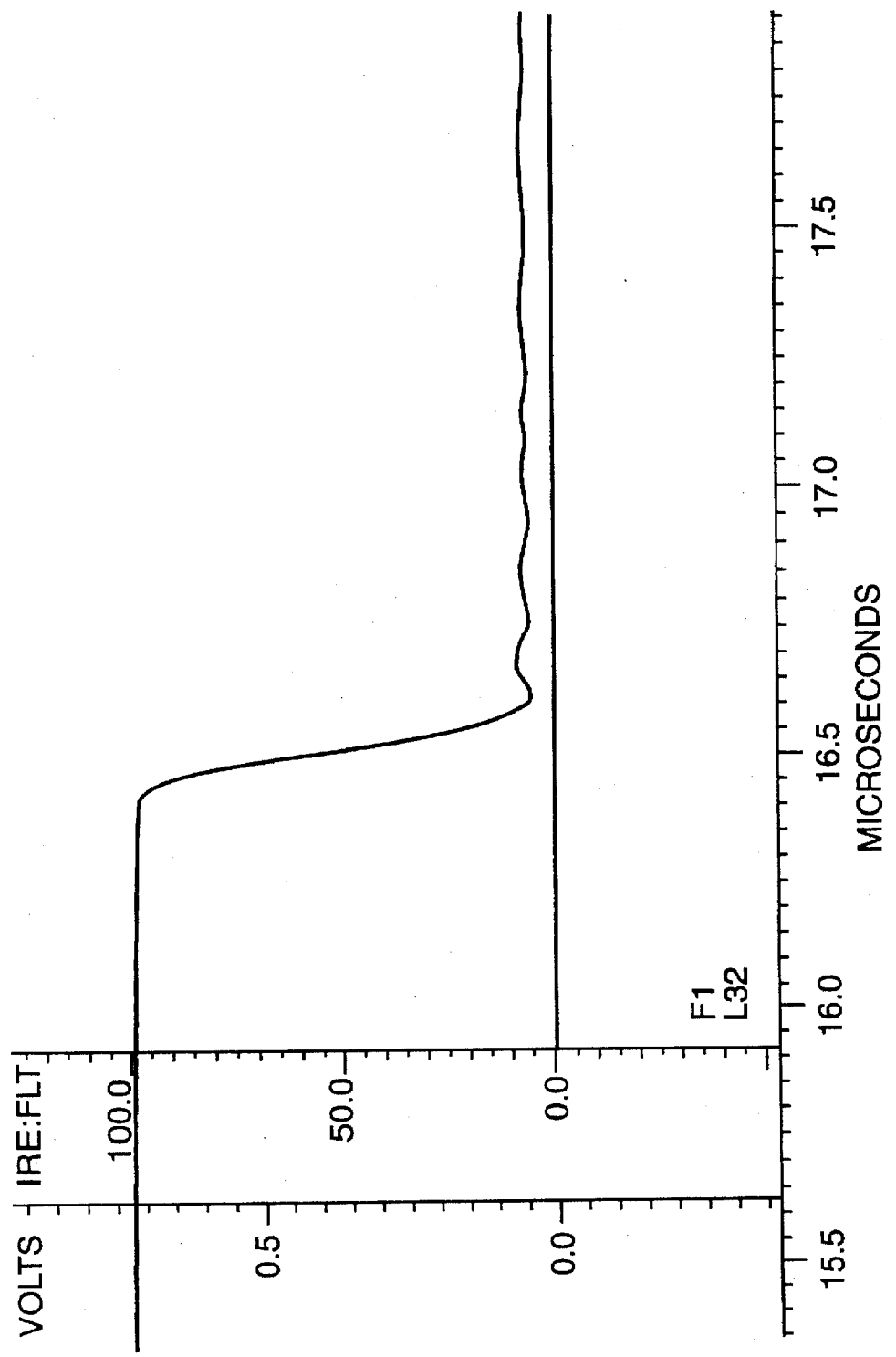

FIG. 7 shows in detail the 2T high-to-low first transition around microsecond 16.4 of line 32. The interpolation example used in this document for transitions with an amplitude "A" is nearly identical to this transition.

If the value of $F_c$ is raised to 4.5 MHz, two phantom pixels are required in the worst case between valid pixels, significantly raising the DDTS transmission efficiency.

In this second example, the interpolation equations for a 255 to 0 transition can be reduced to

| Pixel | Value |
|---|---|
| P(n) = | 255 |
| P(ph1) = | 255 sin²(60°) |
| P(ph2) = | 255 sin²(30°) |
| P(n + 1) = | 0 | or, numerically, and after rounding-off to the nearest integer,

| Pixel | Value |
|---|---|
| P(n) = | 255 |
| P(ph1) = | 191 |
| P(ph2) = | 64 |
| P(n + 1) = | 0 |

Note that the phantom pixels carry no information content; however, since the interpolation is done at the transmitter portion 10 following mathematical algorithms such as those described above, the contents of the phantom pixels can be used as an error correction mechanism by simply applying the reverse procedures in decoder 18 at the receiver portion 16. This results in increased transmission efficiency.

Note that the numbers shown in the second example given above require a bandwidth of $F_c$=4.5 MHz, while the current value for NTSC video is 4.0 MHz. However, the DDTS is intended for digital data transmission. Consequently, it may not require an aural (sound) carrier, normally located above the picture carrier. Consequently, the new (4.5 MHz) cutoff frequency can be safely used while maintaining the bandwidth of the video-only transmitted signal within the 6 MHz allowed by the FCC for one television or cable channel.

It is believed to be apparent that the interpolation mechanism at the transmitter portion 10 can be implemented both on or off line. To do so, the incoming ECDATA stream from encoder 12 is first converted to the appropriate format. If, as described above, only the luminance signal is used and the signal-to-noise ratio of the system permits only the transmission of, for example, six bits per pixel, the incoming ECDATA is registered first in 6 Bit format, using the two least significant bits with fixed values. Then the phantom pixel values between each two valid ECDATA pixels are computed on line and inserted in data formatter 13 between the ECDATA values. The resultant (bandwidth limited) data stream BWLDATA is fed to the luma inputs of encoder 14. The encoder puts out composite video, blanking and sync (CVBS) which may be low-pass filtered, and then modulated onto the RF carrier using the customary Suppressed Carrier Single Side Band amplitude modulation scheme. The carrier is broadcast by a terrestrial TV transmitter 15 (FIG. 1A), or fed into a cable combiner for transmission over a conventional cable system.

Additional artifacts may be introduced at the transmitter portion to enhance the system effectiveness. One such artifact may consist of assigning fixed values to the first and second valid data pixels on each line. For example, if the first data pixel on each scan line is given the value FFh (255 decimal) and the second pixel assumes value 00h (0 decimal), these known values may be used at the receiver portion 16 (FIG. 1B) to adjust the gain of decoder 18 and compensate for line distortions. Many other similar schemes can indeed be implemented.

Referring specifically to FIG. 1B, this is a block diagram of the DDTS receiver portion 16. RF from transmitter portion 10 (FIG. 1A) is received, tuned and amplified by a conventional TV, Cable, Microwave or Satellite tuner and converted to analog Composite Video, Blanking and Sync (CVBS). Philips SAA7110 decoder 18 accepts this CVBS and converts it into digital format. The SAA7110 is programmed for maximum luminance bandwidth and no chroma output. The six most significant bits of the byte-wide luminance bus of every three pixels carry the data and error correction information. The remaining least significant bits are ignored. The decoder 18 regenerates the pixel clock PCLK and separates the sync components from the data information.

A divide-by-three counter 18A reset during the blanking interval is used to extract the valid pixels (data) from the phantom pixels. The output of the counter is used to gate valid data to a simple reformatter 19, which realigns the six valid bits per pixel into byte-wide error correction plus data (ECDATA). ECDATA is then fed to the LS64710 Reed-Solomon decoder 20 which performs the inverse function from encoder 14 at transmitter portion 10, thus outputting error corrected DATA to data utilizer 21.

The receiver portion 16 described above is extremely simple and inexpensive. This is important because a DTTS used for broadcast or for a cable system may have only one transmitter but a large number of receivers, It is again noted that, when referring to "pixels" in this text there is meant multibit data samples, the word pixel being used by analogy with such data samples, and not to designate an actual element of a "picture." Likewise, the term "video" is used by analogy to refer to the data stream, in digital or analog form as the case may be, and not to a signal which actually represents TV picture information.

The DDTS according to the invention is of particular applicability to cable network transmissions, such as are used in interactive television systems. In such systems, data typically needs to be transmitted for various purposes, in addition to or in place of conventional TV picture signals.

This represents a particularly advantageous occasion for use of the present invention. One reason is that there are often unoccupied "gaps" in the overall cable TV spectrum, which could be used for data communication, but these gaps do not necessarily have full 6 MHz TV channel bandwidths. If, for example, such a gap has a bandwidth of only 2 MHz, then the digital data of interest can still be transmitted without distortion by simply interpolating more phantom pixels between any two consecutive valid pixels. While this lowers the data rate, it does prevent distortion attributable to the more limited bandwidth.

Thus, the DDTS according to the present invention may be said to be "bandwidth agile."

It will be understood that the invention is also applicable to transmission of compressed data, e.g., data which have been subjected to MPEG I compression, as well as to communications media other than cable networks, such as terrestrial broadcast, microwave, satellite transmission, etc.

What is claimed is:

1. A system for communicating a sequence of digital data from a transmitter to a receiver, comprising:

means at the transmitter for interpolating one or more phantom data between consecutive ones of said digital data that have an amplitude transition with an associated frequency component that exceeds a predetermined frequency spectrum for transmission, each of said one or more phantom data having an amplitude value which lies between the amplitude values of said consecutive digital data, to generate an interpolated data sequence maintained within the predetermined frequency spectrum; and means at the receiver for separating said digital data from said phantom data to reproduce the sequence of digital data.

2. The system of claim 1, wherein the number and amplitude values of the phantom data interpolated between the consecutive digital data are a function of an available transmission bandwidth for communication between the transmitter and receiver.

3. The system of claim 1, wherein the number of the phantom data interpolated between the consecutive digital data varies as a function of the available bandwidth for communication between the transmitter and receiver the more.

4. The system of claim 1, further comprising means at the transmitter for adding, in digital data form, signals analogous to synchronizing signals of standard broadcast television.

5. The system of claim 4, further comprising means at the receiver for utilizing said synchronizing signals in separating said digital data from said phantom data.

6. The system of claim 2, wherein the number of the phantom data interpolated between the consecutive digital data varies as a function of the difference between the amplitude values of the consecutive digital data.

7. A method for communicating a sequence of digital data from a transmitter to a receiver, comprising:

at the transmitter, interpolating one or more phantom data between consecutive ones of said digital data that have an amplitude transition with an associated frequency component that exceeds a predetermined frequency spectrum for transmission, each of said one or more phantom data having an amplitude value which lies between the amplitude values of said consecutive digital data, to generate a interpolated data sequence maintained within the predetermined frequency spectrum; and at the receiver, separating said digital data from said phantom data to reproduce the sequence of digital data.

8. The method of claim 7, wherein the number and amplitude value of the phantom data interpolated between the consecutive digital data varies as a function of the available bandwidth for transmission between the transmitter and receiver.

9. The method of claim 7, wherein said digital data comprises digital pixel data.

10. In a transmitter for communicating a sequence of digital data to a receiver, a combination comprising:

a digital data source for providing a sequence of digital data;

a data formatter for interpolating one or more phantom data between consecutive ones of said digital data that have an amplitude transition with an associated frequency component that exceeds a predetermined frequency spectrum for transmission, wherein each of said one or more phantom data having an amplitude value which lies between the amplitude values of said consecutive digital data, thereby producing an interpolated data sequence within the predetermined frequency spectrum for transmission.

11. The combination of claim 10, wherein said sequence of digital data comprises digital pixel data.

12. The combination of claim 11, wherein the one or more phantom data comprise sine squared pulses.

13. The combination of claim 11, further comprising a digital video encoder coupled to the data formatter for encoding the interpolated data sequence in a television format.

* * * * *